United States Patent
Nishida et al.

(10) Patent No.: US 6,612,731 B2
(45) Date of Patent: Sep. 2, 2003

(54) MIXING APPARATUS

(75) Inventors: Shozo Nishida, Yokohama (JP); Yuichiro Fujiyama, Yokohama (JP)

(73) Assignees: Nippon Oil Co., Ltd., Tokyo (JP); Petroleum Energy Center, Tokyo (JP)

(*) Notice: Subject to any disclaimer, the term of this patent is extended or adjusted under 35 U.S.C. 154(b) by 15 days.

(21) Appl. No.: 09/725,626

(22) Filed: Nov. 29, 2000

(65) Prior Publication Data

US 2001/0000024 A1 Mar. 15, 2001

Related U.S. Application Data

(62) Division of application No. 09/042,396, filed on Mar. 13, 1998, now Pat. No. 6,186,658.

(30) Foreign Application Priority Data

Mar. 14, 1997 (JP) .............................. 9-082372
Mar. 14, 1997 (JP) .............................. 9-082373

(51) Int. Cl.$^7$ ................................ B01F 5/00
(52) U.S. Cl. ............... 366/173.2; 366/175.2; 366/181.5; 208/153; 208/165
(58) Field of Search .................. 366/101, 106, 366/107, 137.1, 173.1, 173.2, 167.1, 178.2, 178.1, 177.1, 154.1, 158.5, 174.1, 175.2, 181.5; 208/153, 158, 167, 165, 170, 173; 422/232

(56) References Cited

U.S. PATENT DOCUMENTS

| | | | |
|---|---|---|---|
| 21,819 A | * 10/1858 | Clark | |
| 2,446,986 A | * 8/1948 | Simpson | |
| 2,534,253 A | * 12/1950 | Fash | |
| 2,662,006 A | * 12/1953 | Eastwood | |
| 2,949,347 A | * 8/1960 | van Pool | |
| 3,071,540 A | 1/1963 | McMahon et al. | |
| 3,232,590 A | * 2/1966 | Eckert | |
| 4,191,480 A | 3/1980 | Hiorth | |
| 4,323,314 A | 4/1982 | Kaiser-Wirz | |
| 4,919,898 A | 4/1990 | Gartside et al. | |
| 5,296,131 A | 3/1994 | Raterman | |
| 5,338,438 A | 8/1994 | Demoulin et al. | |
| 5,344,554 A | 9/1994 | Pontier et al. | |
| 5,469,994 A | 11/1995 | Reh et al. | |
| 5,507,573 A | 4/1996 | Hiorth | |
| 6,186,658 B1 | * 2/2001 | Nishida et al. | |

FOREIGN PATENT DOCUMENTS

BE  715 089  9/1968
DE  1 036 217  8/1958

OTHER PUBLICATIONS

European Search Report, 2 pages.

* cited by examiner

Primary Examiner—Charles E. Cooley
Assistant Examiner—David Sorkin
(74) Attorney, Agent, or Firm—Akin, Gump, Strauss, Hauer & Feld, L.L.P.

(57) ABSTRACT

An apparatus for mixing a fluid feed stock, such as a heavy oil, and particles of a catalyst for gasifying the heavy oil in a reactor, comprises the reactor having in the upper portion a circular port through which the particles are fed, a moving bed-forming section disposed on and in communication with the reactor for forming the particles into an annular or cylindrical high-velocity moving bed by dropping the particles downwardly into the reactor, while dispersing the particles radially, an external fluid feed section located so as to spray the feed stock over the entire upper outer periphery of the annular or cylindrical moving bed passing through the reactor, and an internal fluid-feed section located so as to spray the fluid over the entire upper inner periphery corresponding to the outer periphery of the annular moving bed.

13 Claims, 9 Drawing Sheets

→ feed stock
→ steam
--→ catalyst

MIXING APPARATUS

CROSS-REFERENCE TO RELATED APPLICATION

This application is a division of U.S. application Ser. No. 09/042,396, filed Mar. 13, 1998, now U.S. Pat. No. 6,186,658.

BACKGROUND OF THE INVENTION

1. Field of the Invention

This invention relates to an apparatus for mixing a fluid, such as a heavy oil, and particles, such as a catalyst, heated at elevated temperatures.

2. Prior Art

Reaction systems are known in which solid particles, as a catalyst or a heat medium, are brought into contact with a reactant. Moving bed type reactors are a typical example of such reaction system, which reactors are classified into those utilizing a concentrated fluidized bed (bubbles-fluidized bed) and those utilizing a high-speed moving bed (fluidized bed). The high-velocity moving bed is used for a reaction in which a solid and a gas must come into contact for a short period of time. Currently, an upflow-type high-velocity moving bed reactor, a so-called "riser-type," has mainly been employed in a fluid catalytic cracking apparatus used for the production of a gasoline from a feed stock, such as a heavy oil. This reactor is capable of reducing contact time with an improvement of catalytic ability, leading to an enhancement of selectivity of a final product and suppression of unfavorable excessive cracking reactions.

Recently, a strong demand has been made for an enhancement in selective productivity of a gasoline or a light olefin, and an investigation has been conducted for use of a downflow type high-velocity moving bed reactor, which is free from back-mixing, which adversely affects an improvement of the selectivity.

When producing gasoline from a feed stock, such as a heavy oil, using a fluid catalytic cracking apparatus equipped with the existing upflow-type reactor having a high-speed moving bed, the contact reaction therein takes several seconds. In contrast, when producing a light olefin, the reaction time is required to be reduced on the order of 0.1 to 1.5 seconds. A rapid mixture of a feed stock and a catalyst and vaporization thereof at the inlet port of a reactor is indispensable, in order to conduct the contact reaction in a short period of time. Furthermore, it has become necessary to increase the recycle ratio of catalyst to oil to compensate for a reduction in conversion resulting from a shortened reaction time.

In view of this background, there has been demanded an apparatus which is capable of rapid mixture and vaporization of the feed stock and the catalyst at the inlet of the existing upflow-type reactor to form a high-speed moving bed, and which enables a recycle ratio of catalyst to oil several times greater than that (catalyst/oil ratio of 5–8) of a catalytic cracking apparatus for producing a gasoline from a feed stock, such as a heavy oil.

BRIEF SUMMARY OF THE INVENTION

With the foregoing difficulties of the prior art in view, the present invention seeks to provide an apparatus which is capable of mixing a fluid and solid particles uniformly and rapidly.

According to the invention, there is provided an apparatus for mixing a fluid of a feed stock, such as a heavy oil, and particles of a catalyst for gasifying the fluid in a reactor, which comprises providing in the upper portion of the reactor a circular port through which the particles are fed, a moving bed-forming section disposed on and in communication with the reactor for forming the particles into an annular high-velocity moving bed by feeding the particles downwardly into the reactor while dispersing the particles circularly, an external fluid feed section located so as to spray the feed stock over the entire upper outer periphery of the annular moving bed passing through the reactor, and an internal fluid-feed section located so as to spray the fluid over the entire upper inner periphery corresponding to the outer periphery of the annular moving bed.

According to another aspect of the invention, there is provided an apparatus for mixing a fluid of a feed stock, such as a heavy oil, and the particles of a catalyst for gasifying the fluid, which comprises a plurality of stand pipes extending vertically, a distributing device for distributing the particles uniformly into the stand pipes, a mixing section positioned below the distributing device, from the interior of which the stand pipes extend to the upper interior of the mixing section to feed the particles thereto, a plurality of plates arranged in the mixing section and below the stand pipes for dispersing the particles falling therefrom outwardly in a radial direction, and a fluid-feed chamber arranged in the mixing section in surrounding relation to the outer periphery of each of the stand pipes to spray the fluid downwardly in a vertical direction in close proximity to and in surrounding relation to the entire outer periphery of the cylinder of particles falling from each of the stand pipes, so as to collide with the particles after being dispersed by the plates.

According to another aspect of the invention, there is provided an apparatus for mixing the fluid of a feed stock, such as a heavy oil, and the particles of a catalyst for gasifying the fluid, which comprises a plurality of stand pipes extending vertically, a distributing device for distributing the particles uniformly into the stand pipes, a mixing section positioned below the distributing device, from the interior of which the stand pipes extend into the upper interior of the mixing section to feed the particles thereto, a plurality of plates arranged in the mixing section and below the stand pipes for dispersing the particles falling therefrom outwardly in a radial direction, and a fluid-feed chamber arranged in the mixing section in surrounding relation to the outer periphery of each of the stand pipes to spray the fluid over the entire outer periphery of the cylinder of particles falling from each of the stand pipes.

It is necessary for a short contact reaction to conduct a rapid uniform mixture of and vaporization of a feed stock and particles (catalyst) at the inlet of a reactor. Therefore, it is required to supply a feed stock in the form of fine droplets, for example by means of a spray, and to disperse the catalyst uniformly in the form of solid particles. The uniform mixture can be effected in a wide space, but fails to be fully accomplished in a limited space. An extensive research and development to seek an alternative for solving the problem resulted in the following conclusion.

In this alternative solution, after a feed stock in droplet form is made finer to some extent by means of a spray nozzle, the sprayed feed stock is brought into collision with solid particles, so as to be further refined by impact caused by the collision. Importantly, solid particles are increased in surface area as much as possible, so that the surface thereof can entirely collide with the sprayed feed stock. Hereinafter, it is described what shape the particles take in order to have a large surface area in a limited space size.

Referring to FIGS. 9, 11 and 13, there are shown tubular reactors in a state that particles 153 flow downwardly with the volume thereof being controlled. FIGS. 10, 12 and 14 repectively show a cross-sectional view of each tubular reactor 150, 151 and 152 shown in FIGS. 9, 11 and 13. As shown in these figures, the flowing particles in the cross-section of each of the tubular reactors take simple forms, among which those shown in FIG. 10(c), 12 and 14 are suitable for uniform mixture. The shape of the flowing particles in the cross-section of the tubular reactors shown in FIGS. 10 (a) and (b) are not adequate, because the particles flows locally in one side of the reactor 150. Suitable shapes of flowing particles for rapid mixture are those having a large outer surface. The annular shape formed by the flowing particles as shown in FIG. 14 has the largest outer surface and thus is found to be suitable for rapid mixture. In view of the foregoing, the particles flowing in an annular form are most suitable for rapid uniform mixture in a tubular reactor while controlling an amount of the particles to be mixed.

The above and other features and advantages of the invention will be better understood from reading the following detailed description with reference to the accompanying drawings.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
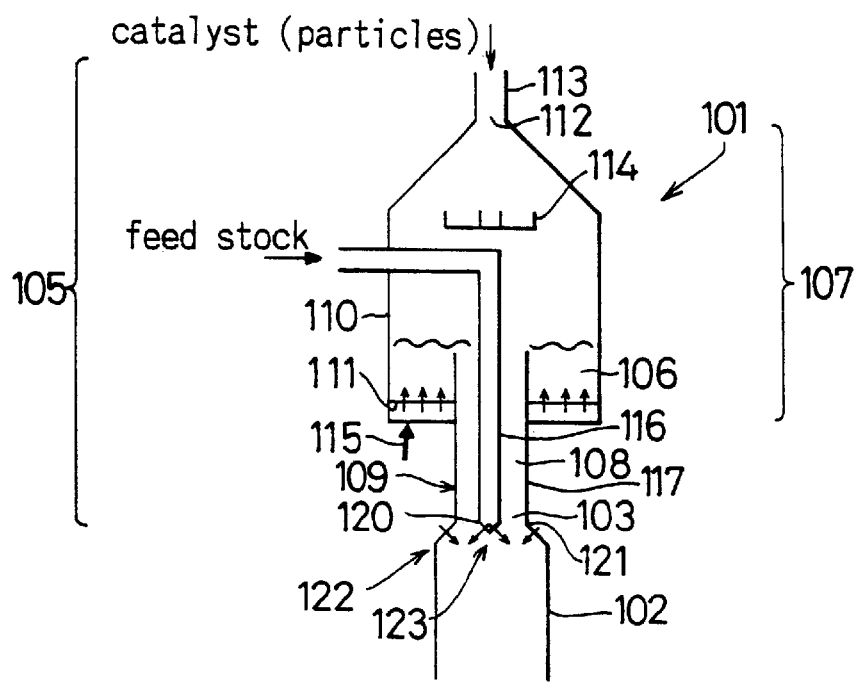
FIG. 1 is a schematic view of an apparatus embodying the invention.

Referring now to the drawings, particularly to FIG. 1, there is shown an apparatus 101 for mixing the fluid of a feed stock, such as a heavy oil, and catalyst particles enabling the heavy oil to be vaporized in a tubular reactor 102.

Figure 4:
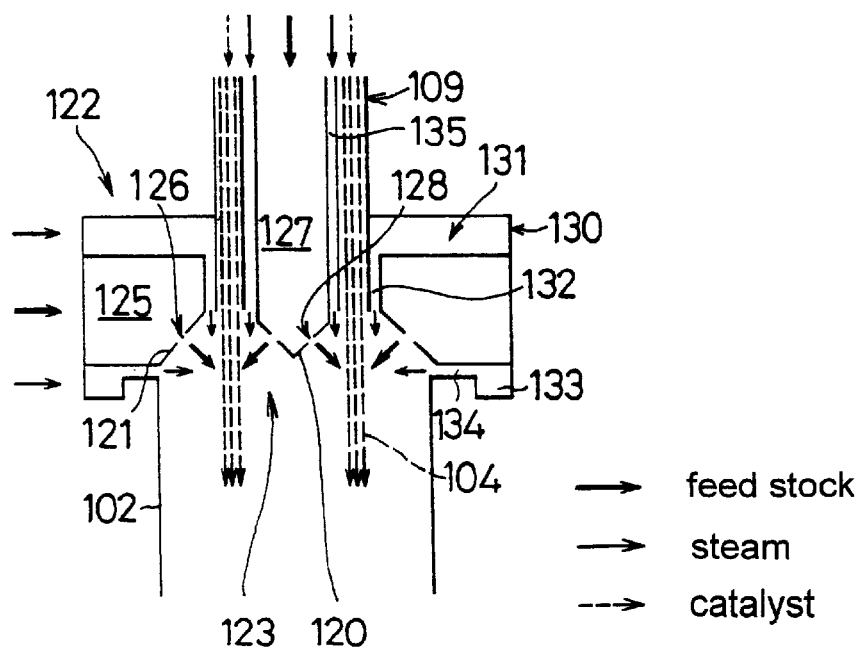
FIG. 4 is a schematic view of an upper portion of a tubular reactor of the inventive apparatus.

The reactor 102 is a vertically extending cylindrical tube (vertical downflow-type reactor) provided in its upper portion with a port 103 through which the catalyst particles are supplied. The mixing apparatus 101 is provided on the reactor 102 with a moving bed-forming section 105 for forming an annular high-velocity moving bed 104, as shown in FIG. 4, by dropping the catalyst particles from the port 103 successively while distributing the same annularly.

The forming section 105 is not restricted to this construction as long as the high-velocity moving bed 104 can be formed in the reactor 102. For instance, in FIG. 1 the particles are formed into a moving bed by fluidization using air or gas. The moving bed-forming section 105 comprises a controlling section 107 for adjusting the density of a moving bed 106 formed by fluidizing the catalyst particles and an annular forming tube 109 having a through passage 108 where the particles are formed into an annular shape, extending vertically.

The controlling section includes a chamber 110 extending vertically and having a cross-section in a circular, polygonal, rectangular or annular shape. The chamber 110 is provided in the inner lower portion with a porous plate type dispersing means using a gas and a hybrid-type dispersing means. Provided in the chamber 110 in FIG. 1 is a porous plate 111. Furthermore, the chamber 110 is provided in the middle upper portion with a feed port 112 communicating with a feed pipe 113 through which to feed the particles heated at elevated temperatures, such as a catalyst of silica alumina particles having a particle size of 1–500 μm and heated to a temperature of 450–700° C. Mounted below the feed port 112 and above the middle portion of the chamber is a receptacle 114 receiving the particles supplied from the feed pipe 113. The particles overflow the receptacle 114 and then fall onto the porous plate 111. The bottom portion of the chamber 110 is connected with a fluid gas feed pipe 115 supplying moving gas, such as air or inactive gas, through the porous plate to the chamber 110, so as to fluidize the particles on the plate 111 to form the fluidized bed 106.

The chamber 110 is connected concentrically at the center of the bottom with the annular forming tube 109 extending through the porous plate 111. The annular tube 109 has a dual wall structure comprised of an inner tube 116 and an outer tube 117 arranged in concentric relation, forming therebetween an annular passage 108. The inner tube 116 extends vertically to the vicinity of the receptacle 114 and further extends therefrom horizontally, so as to penetrate the side wall of the chamber 110 and connect with a heavy oil supplying device (not shown), such as a pump. The outer tube 117 extends through the porous plate 111 to a certain level, which is higher than where the porous plate 111 is located, and acts as a weir so that the fluidized bed increases in height and then surges into the through-passage 108, resulting in the formation of a high-velocity moving bed while passing through the outer tube 117. Needless to say, the length of the outer tube 117 is determined by that of a high-velocity moving bed determined arbitrarily.

Figure 2:
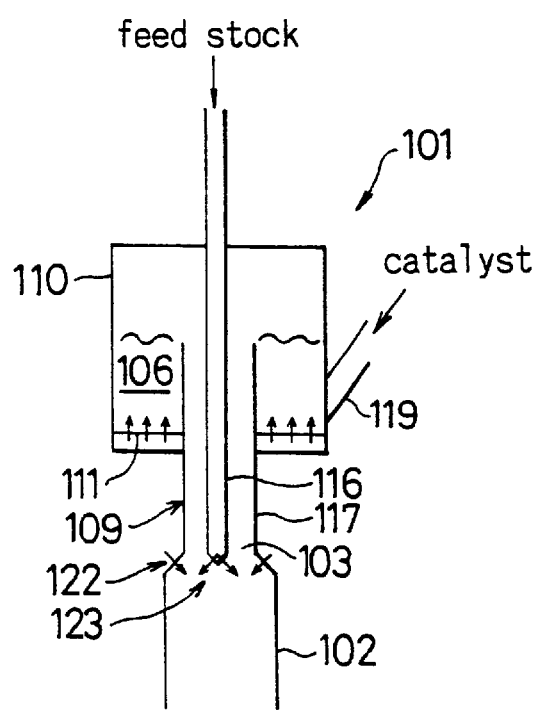
FIG. 2 is a schematic view of a modified form of apparatus embodying the invention.

Alternatively, the chamber 110 may be constructed as shown in FIG. 2. More specifically, a feed pipe 119 for feeding the particles may be connected with a side wall of the chamber 110 so as to feed the particles directly onto the porous plate 111, and the inner tube 116 may extend linearly so as to penetrate the top wall of the chamber 110. Even with such a construction, the fluidized bed 106 can be formed.

Figure 3:
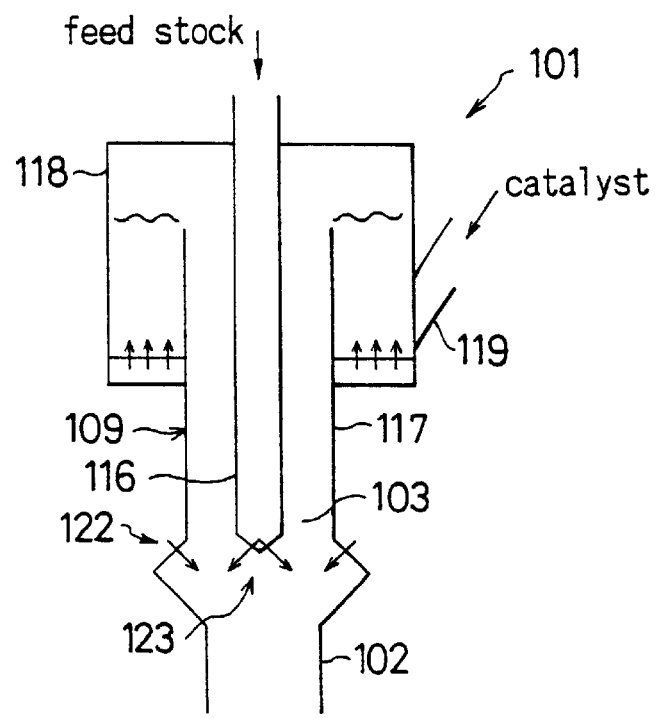
FIG. 3 is a schematic view of a further modified form of apparatus embodying the invention.

As shown in FIG. 1, the lower ends of the inner and outer tubes 116 and 117 are merged with inner and outer peripheral walls 120 and 121 respectively, dividing the feed port 103 into sections through which the particles in the form of the high-velocity moving bed 104 enter into the reactor 102. The diameter of the outer tube 117 is determined depending upon the feed rate of the particles and may be formed to be smaller than the diameter of the reactor 102, as shown in FIGS. 1 and 2. Alternatively, the outer tube may have a larger diameter than that of the reactor tube in the case where the particles are fed in a large amount, as shown in FIG. 3. The diameter of the inner tube 116 is also selected depending upon the feed rate of the particles.

Figure 5:
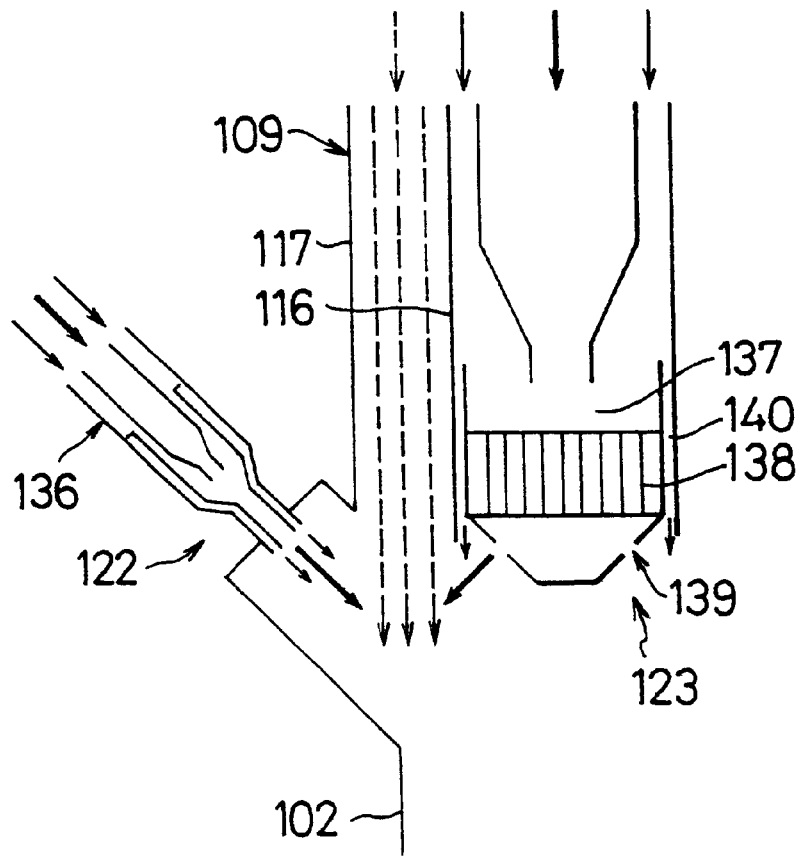
FIG. 5 is a schematic view of a modified form of the same.

As shown in FIGS. 1 through 3, an external fluid feed section 122 is provided externally around the outer periphery of the outer walls 121 and above the reactor tube 102. The fluid feed device sprays a fluid over the whole outer periphery of the annular moving bed 104. Another fluid feed section 123 is provided on the inner peripheral wall 120 to spray a fluid over the whole inner periphery of the annular moving bed 104. These fluid feed sections 122 and 123 may have any type of construction as long as they can spray a liquid feed stock, such as a heavy oil, over the inner and outer peripheral surfaces of the moving bed 104, and thus may be constructed as shown in FIGS. 4 and 5.

FIG. 4 illustrates that a feed stock is sprayed by a hydraulic spraying system using blasting nozzles, effected by increasing the linear speed thereof. In this system, an atomizing steam is not used as a spraying medium. More specifically, an annular feed chamber 125 for feeding a feed stock is provided integrally with the reactor 102 in surrounding relation to the outer peripheral wall 121 thereof. The annular feed chamber 125 may be provided separately from the reactor 102. The annular feed chamber 125 is provided on its inner wall (outer peripheral wall 121 of the reactor 102) with a plurality of external spraying nozzles 126 through which a feed stock is sprayed toward the annular moving bed 104. These nozzles are disposed spaced apart at certain intervals. The external spraying nozzles 126 are not restricted in their spraying angle as long as the fluid can be further made finer by impact upon collision with the particles. Preferably, the nozzles are arranged to spray a liquid downwardly at an angle of 15–75° with respect to the horizontal direction. In FIG. 4, the spray angle is 45° with respect to the horizontal direction. The number of spraying nozzles 126 is selected so that a liquid can be sprayed over the entire outer surface of the moving bed.

The inner peripheral wall 120 forms substantially the lower part of the inner tube 116, which serves also as a cylindrical feed chamber 127 for feeding a feed stock. The lower end (tip) of the inner peripheral wall is in a conical shape, directed downwardly and provided with a plurality of internal spraying nozzles 128 through which the feed stock is sprayed toward the annular moving bed 104. The spraying nozzles 128 are equally spaced in the circumferential direction of the tip of the inner peripheral wall to spray the feed stock over the entire inner surface of the moving bed 104. There is no limitation to the spray angle of the internal spraying nozzles 128 as long as the sprayed material can be further made finer by impact occurring upon collision with the particles. Preferably, the internal nozzles are disposed to spray the feed stock downwardly at an angle of 15–75° with respect to the horizontal direction. In FIG. 4, the spraying angle of the internal nozzles is set at 45°. The number of internal nozzles is selected such that the feed stock can be sprayed over the entire inner surface of the moving bed 104. The ratio of the external fluid-feed section 122 to the internal fluid-feed section 123 in spraying rate is not restricted so long as the feed stock can be sprayed over the entire inner and outer surfaces of the moving bed 104. A preferred ratio is in the range of 1:1 to 3:1.

The external and internal fluid-feed sections 122 and 123 are surrounded by a thermal insulating member 130, which prevents the feed stock from coking caused by heat conduction from the catalyst particles heated at a temperature of 450–700° C. The insulating member 130 is not restricted in its construction, so long as it can prevent the feed stock from being adversely affected by the particles heated to elevated temperatures. For instance, heat insulation may be effected with the use of a conventional insulating material, such as air or steam. FIG. 4 illustrates that heat insulation is effected by flowing steam into chambers formed on the upper and lower portions of the annular feed chamber 125. More specifically, an upper annular steam-feed chamber 131 is disposed circumferentially on the upper portion of the feed chamber 125 to communicate with a vertically extending small gap (clearance) 132 defined between the feed chamber 125 and the forming tube 109 in surrounding relation thereto. Steam supplied into the steam-feed chamber 131 flows downwardly into the reactor 102 through the small gap 132 whose lower end opens to the port 103, such that the upper portion of the feed chamber 125 is thermally insulated. Furthermore, a lower annular steam-feed chamber 133 is disposed circumferentially on the lower portion of the feed chamber 125 to communicate with a horizontally extending small gap 134 defined between the steam-feed chamber 133 and the reactor 102. Steam supplied into the steam-feed chamber 133 flows horizontally into the reactor 102 through the small gap 134 whose end opens into the reactor 102, such that the lower portion, of the feed chamber is thermally insulated. A vertically extending passage 135 is defined between the inner wall of the inner tube 116 and the outer wall of the feed chamber 127. In other words, the inner tube 116 has a dual structure. Steam is fed downwardly into the reactor 102 through the passage 135 whose lower end opens into the reactor 102 to thermally insulate the feed stock sprayed through the feed chamber 127.

FIG. 5 shows exemplarily an external spraying nozzle and an internal spraying nozzle used for a method in which a fluid, such as a feed stock, is sprayed using a medium, such as a gas or an atomizing steam. For the sake of brevity, the same parts in FIG. 5 corresponding to those in FIG. 3 are indicated by the same numerals.

An external fluid-feed section 122 in FIG. 5 is different from that in FIG. 4 in that a plurality of spraying nozzles 136, into which the feed stock is directly supplied, are disposed circumferentially at certain intervals to spray the feed stock over the entire outer surface of the moving bed. The spraying nozzles 136 are of a type having an internal mixing structure in which a feed stock flows through the center, outside of which an atomizing steam flows to the tip of the nozzle to thermally insulate the feed stock.

The internal fluid-feed section 123 in FIG. 5 employs an internal mixing structure in which an atomizer 138 is mounted in an internal mixing chamber 137 to enhance the spray effect. The atomizer 138 has a plurality of nozzles 139 disposed circumferentially on its lower tip at certain intervals to spray the feed stock over the entire inner surface of the annularly flowing particles. A passage 140 for steam is defined by the inner wall of the inner tube 116 and the outer wall of the mixing chamber 137 to utilize a part of the atomizing steam as a thermal insulating means as well as the external spraying nozzle 136.

There is described hereinafter a method of contact-mixture of a feed stock (heavy oil) and a catalyst of silica alumina particles heated to a temperature of 450–700° C. using the apparatus 101.

Catalyst particles are supplied from a feed pipe 113 and fall successively through a feed port 112 onto a receptacle 114 from which overflowed catalyst particles further fall onto a porous plate 111. The catalyst particles collecting densely on the porous plate 111 in the circumferential direction can be uniformly dispersed toward a spot of a lower density while moving to be formed into an annularr bed.

The fluidized bed increases in height and overflows an outer tube 117 into a through passage 108 from the entire circumferential periphery of the outer tube and forms into an annular high-velocity moving bed 104, while passing via the through passage 108. The fluidized bed then enters through a port 103 into a reactor 102.

Figure 6:
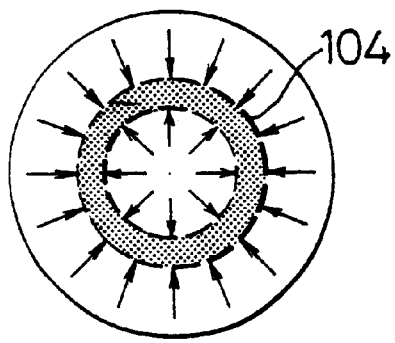
FIG. 6 is a sectional view of a tubular reactor illustrating a state where a fluid is sprayed toward particles.

A feed stock is sprayed by external spray nozzles 126 and internal spray nozzles 128 over the upper outer and inner surfaces of the moving bed 104 around in the entire circumference thereof, as shown in FIG. 6. Due to a thermal insulating means 130 provided on the outsides of the external and internal spraying nozzles, the feed stock sprayed therethrough is insulated from the heat exerted by the heated catalyst particles (450–700° C.) and is thus free from coking. The sprayed feed stock collides with the catalyst particles forming the annular moving bed 104, and then sputters in the form of further refined particles by the impact upon collision. Therefore, the mixture of the catalyst particles and the heavy oil can be conducted effectively. The resulting mixture moves downwardly in the reactor 102.

The inventive apparatus makes possible an increase of the recycle ratio of catalyst to oil in the reactor 102 up to 50:1, which is several times greater than that (5–8:1) of a fluid catalytic cracking apparatus having a conventional reactor using a rising type of high-velocity moving bed.

In the inventive apparatus, the contact of a feed stock and particles can be effected efficiently by spraying the feed stock from both the outer and inner peripheries of an annular moving bed of catalyst particles to be contacted and mixed therewith. Furthermore, the feed stock can be mixed rapidly and uniformly with the particles, because the feed stock is further refined by impact upon contact with the annularly flowing particles. Due to the capability of spraying a feed stock from the outer and inner peripheries of the annular particle bed, the proportion of the particles to be used can be increased, such that the weight ratio of particles to a feed stock is up to 50:1.

Therefore, the contact reaction can be conducted uniformly for an extremely short period of time due to the capability of reduction in time (approximately 0.1 to 1.5 seconds) for contacting a feed stock with catalyst particles, such that an unfavorable excess cracking reaction can be avoided, leading to the capability of producing a gasoline enhanced in quality.

Figure 7:
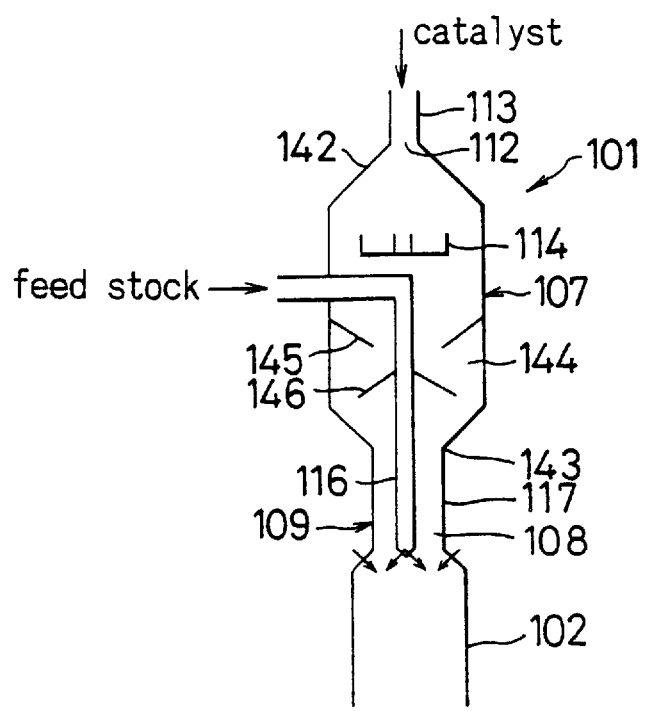
FIG. 7 is a schematic view of a further modified form of apparatus embodying the invention.

Shown in FIG. 7 is a modification of the controlling section 107, in which dispersion is conducted merely by allowing the catalyst particles to fall freely, not by fluidization.

More specifically, the controlling section 107 includes a vessel 142 which is in the form of a vertical cylinder having a feed port 112 on its upper portion, connected with a feed pipe 113 for feeding particles, and a receptacle 114 for receiving the particles in the interior of the upper portion and below the feed port 112. The vessel 142 has a lower part in the form of a hopper reduced in diameter progressively toward the bottom. Provided on the bottom is a discharge port 143 connected with the tip end of an outer tube ,117, constituting a moving bed forming tube 109. An inner tube 116 also constituting the forming tube 109 extends in close proximity to the receptacle 114 and then extends bent in a horizontal direction to penetrate the side wall of the vessel 142. Between the inner tube 116 and the vessel 142, there is defined a vertical annular passage 144 through which particles pass downwardly. In the passage 144, a plurality of baffles 145 and 146 are disposed at certain intervals in the longitudinal direction to alter the flow direction of particles, so as to disperse them uniformly in the circumferential direction. The baffles 145 and 146 are not restricted in their shapes and number, so long as they can alter the flow direction of the particles and disperse the particles uniformly in the circumferential direction. In the embodiment in FIG. 7, two annular baffles 145 and 146 are disposed at certain intervals to be spaced apart in the vertical direction. More specifically, the annular upper baffle 145 is inclined downwardly in an inward radial direction and is fixed at its outer peripheral edge to the inner wall of the vessel 142, defining a through-opening between its inner peripheral edge and the inner tube 116. The lower annular baffle 146 is inclined downwardly in an outward radial direction and is fixed at its inner peripheral edge to the outer wall of the inner tube 116, defining a through-opening between its outer peripheral edge and the inner wall of the vessel 142. A gas may be supplied through the inlet 112 together with particles. In the case of supplying catalyst particles in a small amount, they can pass smoothly through the forming section 109 by their own weight without feeding a gas. However, if an attempt is made to feed the catalyst particles in a large amount without feeding a gas, a pressure loss occurs in the forming section 109, leading to repletion of the vessel with the catalyst particles due to the provision of the plurality of the baffles. Therefore, supplementation of the pressure is required to overcome the pressure loss in the forming section 109 by feeding a gas together with the catalyst. Furthermore, a reason for feeding a gas is to facilitate uniformity of the density of particles.

With this construction, particles overflowing the receptacle 114 fall onto the upper baffle 145 and move inwardly in the radial direction to its peripheral edge, from which the particles fall through the opening onto the lower baffle 146. The particles on the lower baffle move outwardly in the radial direction to its peripheral edge, from which the particles fall via the through-opening onto the lower portion of the hopper. In this way, the particles are dispersed uniformly in density in the radial direction as they move over the baffles 145 and 146.

The uniform-density stream of particles flows successively into the through-passage 108 and forms into a high-velocity moving bed having an annular shape, while passing through the through-passage 108 in the above-described manner.

The particles in the form of an annular moving bed are brought into contact with a feed stock fed by spraying from its outer and inner peripheries, so that the contact can be effected efficiently. Furthermore, the sprayed feed stock is further refined by impact upon contact, leading to the more efficient contact, so that uniform mixture of the feed stock and particles can be conducted rapidly.

Figure 8:
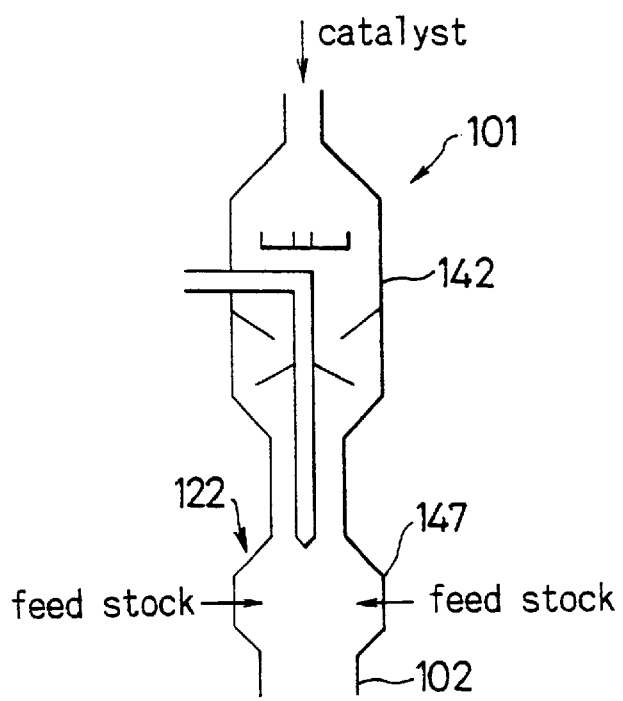
FIG. 8 is a schematic view of a further modified form of apparatus embodying the invention.
Figure 9:
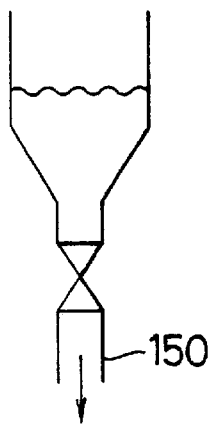
FIG. 9 is an explanatory view showing particles flowing downwardly in a tube.
Figure 10:
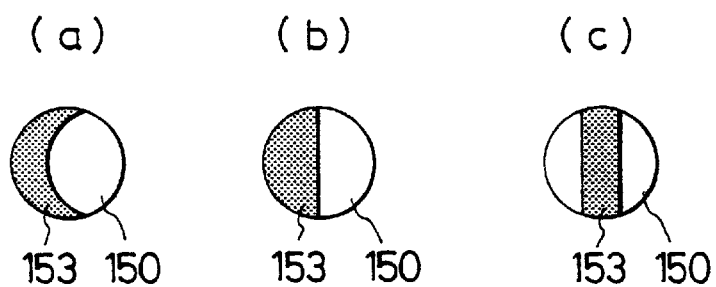
FIGS. 10 (a), (b) and (c) are cross-sectional views of the tube of FIG. 9 showing the particles flowing locally in the tube.
Figure 11:
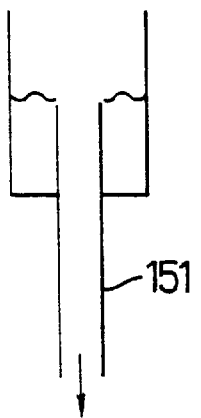
FIG. 11 is an explanatory view showing particles flowing downwardly in a tube.
Figure 12:
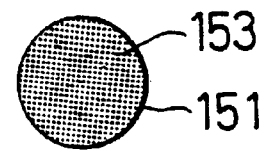
FIG. 12 is a cross-sectional view of the tube of FIG. 11 showing the particles flowing locally in the tube.
Figure 13:
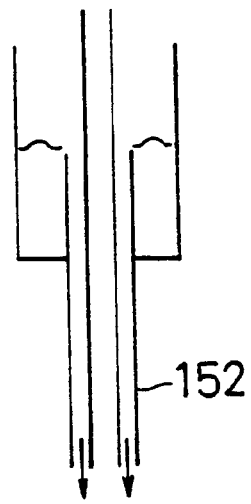
FIG. 13 is an explanatory view showing particles flowing downwardly in a tube.
Figure 14:
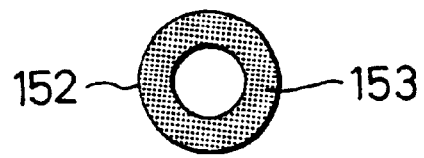
FIG. 14 is a cross-sectional view of the tube of FIG. 13 showing the particles flowing downwardly in the tube.

FIGS. 8 shows a modification of the apparatus shown in FIG. 7, which is different in that the upper portion 147 of a reactor 102 is widened in diameter to be the same as that of a vessel 142 and is provided with an external fluid feed section 122 from which a feed stock is sprayed in a horizontal direction, not downwardly at an angle of 45°.

Referring now to FIG. 15–19, there are shown other embodiments of the inventive mixing apparatus 101.

The mixing apparatus 201 shown in FIG. 15 comprises essentially a dispersing device 203, a plurality of standpipes 202, each having an upper portion extending vertically through the bottom of and up to the upper section of the dispersing device 203, a mixing section 204 into which catalyst particles flow downwardly from the standpipes, each having its lower portion extend into the mixing section 204, a plurality of plates 205 disposed in the mixing section 204 and below the lower part of the standpipes to disperse the particles fed therefrom in the radial direction, and a fluid-feed chamber 206 disposed in the mixing section to spray a fluid such as a feed stock (heavy oil), so as to mix the same with the particles.

The dispersing device 203 is not restricted in its construction, so long as it can distribute particles uniformly into the standpipes. In the embodiment shown in FIG. 15, a fluidized bed is used to distribute the particles.

The dispersing device 203 includes a chamber 207 which is vertical and may be round, polygonal or rectangular in a cross-section. The chamber 207 in FIG. 15 is cylindrical and is provided in its lower portion with a porous plate-type distributor or a pipe grid distributor. In this embodiment, a porous plate 208 is employed. The side wall of the chamber 207 is connected with a feed pipe for feeding particles, such as a silica-alumina catalyst having a diameter of 1–50 μm and heated to a temperature of 450–700° C., to the porous plate. The lower portion of the chamber 207 is connected with a fluidized gas feed pipe 210 for feeding a fluid gas, such as steam, air or inactive gas, through the porous plate 208 into the chamber 207 to fluidize the particles, so as to form a fluidized particle bed 211. Each of the plurality of standpipes 202 extends vertically through the bottom of the chamber 207 and the porous plate 208 and has an upper end extending as far as the mid-section of the chamber 207.

Figure 16:
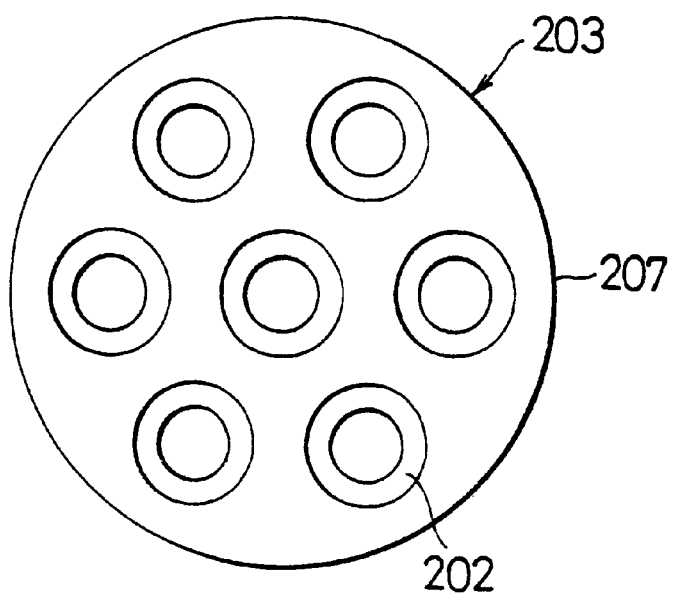
FIG. 16 is a cross-sectional view taken along the line XVI—XVI of FIG. 15.
Figure 17:
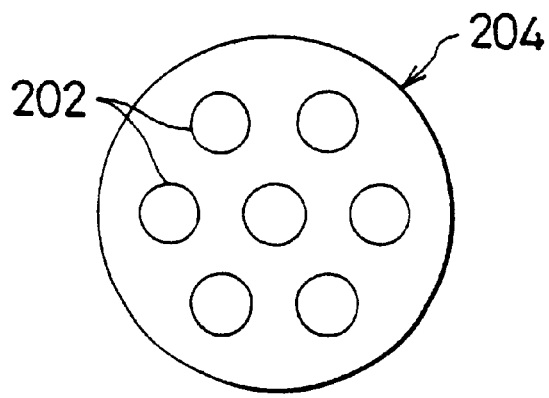
FIG. 17 is a cross-sectional view taken along the line XVII—XVII of FIG. 15.

Although not restricted in number, 3 to 30, preferably 3 to 7, standpipes are provided. The standpipes should be arranged at certain intervals in the chamber 207. In FIG. 16, for instance, there are disposed seven standpipes, six of which are arranged to be spaced equally apart (60°) in the circumferential direction, and one of which is arranged to be at the center. The diameter of each standpipe 202 is selected depending upon the feed rate of particles. However, needless to say, under the conditions that the diameter of a reactor 212, described hereinafter, and the number of the standpipes are constant, the diameter thereof is increased as the feed rate of particles increases and decreased as the feed rate of the same is reduced. The flow ratio of catalyst to oil is in the range of 5–50, preferably 20–30. A ratio less than 5 would result in an insufficient reaction due to a reduction in contact time. A ratio exceeding 50 would involve problems, such as pressure loss and erosion.

Disposed below the chamber 207 is a mixing chamber 204 for mixing a feed stock and the catalyst particles, into which chamber 204 the lower end of each of the stand-pipes extends as far as the upper portion of the mixing chamber 204. Therefore, the fluidized particles pass downwardly through the mixing chamber 204. The mixing chamber 204 is in the form of a cylinder and is connected at its lower portion with a reactor 212 (vertical downward-flow type reactor) having the same diameter as that of the mixing chamber.

The plurality of plates 205 for dispersing the particles flowing from the standpipes 202 in the circumferential direction are disposed therebelow and in the middle section of the mixing chamber 204. These plates 205 are arranged at the same horizontal level. Although not restricted, the plates may be in the shape of a disk having a diameter which is the same as or larger than that of the lower end of the standpipe or having the center recessed lower than the level of its outer periphery, i.e., a dish-shaped disk or a cone.

Furthermore, below these plates there are disposed another plurality of plates 213 for further dispersing the particles falling down from the dispersing plates 205, the dispersing plates 213 being disposed at the same horizontal level. These dispersing plates 213 should be arranged at such positions where the particles flow densely; for instance, the dispersing plates 213 are arranged below the spaces between the dispersing plates 205, as shown in FIG. 15. The dispersing plates 205 may be the same as or different from the dispersing plates 205 located in the upper stream. In FIG. 15, the dispersing plates 205 and 213 are arranged in single tiers, respectively. A preferred number of tiers is in the range of 1 to 5, because too many tiers could increase mixing efficiency but result in pressure loss.

Figure 18:
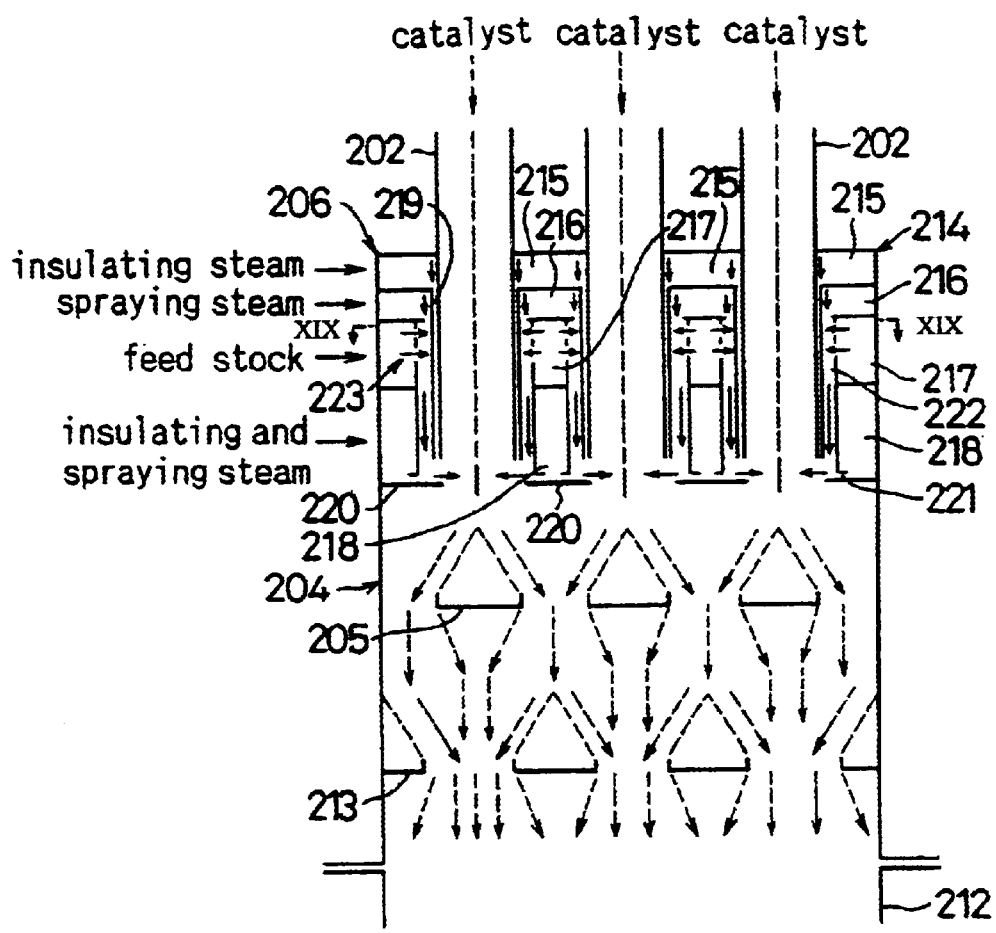
FIG. 18 is a schematic view of the main portion of an apparatus according to the invention.

A fluid-feed chamber 206 is provided in the mixing chamber in surrounding relation to the outer periphery of the standpipes 202 to spray a feed stock, such as a heavy oil. As long as the fluid-feed chamber 206 sprays a feed stock over the entire outer periphery of particles flowing in a form such as a cylinder, the chamber 206 is not restricted in its structure. The spraying angle is selectable from 0 (horizontal direction) to 90°. (vertical direction) as shown in FIGS. 15 and 18. More specifically, the fluid-feed chamber 206 in FIG. 15 is constructed to spray a feed stock downwardly in close proximity and in parallel relation to the outer periphery of the particles flowing cylindrically from the standpipes, so that the sprayed feed stock comes into contact with particles after being dispersed by the plates 205 and 213.

In FIG. 18 the fluid-feed chamber 206 sprays a feed stock at an angle of 0°, i.e., parallel with respect to a horizontal level, by using a spraying medium such as gas or steam.

The fluid-feed chamber 206 is also provided with insulating means 214 as shown in FIG. 18. The upper portion of the mixing section 204 is provided with trays 215–218 which contain steam for thermal insulation, steam for spraying, feed stock and steam for thermal insulation and spraying, respectively. These trays 215–218 are arranged in vertically superposed relation to one another and in surrounding relation to the standpipes. Therefore, the standpipes extend through these trays 215–218. Between the superposed trays 215–218 and the outer periphery of each of the standpipes, there are provided small cylindrical spaces or clearances 219, the upper portion of which communicates with the thermal insulation steam tray 215, so that a thermal insulating steam flows downwardly along the outer periphery of each of the standpipes 202 so as to effect thermal insulation of a feed stock from the heat of the standpipes.

Disposed below the thermal-insulating and spraying steam tray 218 is a partition 220 for thermal insulation extending in a horizontal direction and formed to be directed to the lower ends of the standpipes. More specifically, this partition 220 is in the form of a disk provided with circular openings at the positions conforming with the lower ends of the standpipes. A clearance 221 is provided between the partition 220 and the thermal insulating and spraying steam tray 218, such that the steam therefrom flows, through the clearance 221 inwardly in the radial direction to thermally insulate the inside of the mixing section and the feed stock fed from the feed stock tray 217. The insulating means 214 is constituted by the trays 217 and 218. The insulating means 214 is not restricted in its construction as long as it can thermally insulate a feed stock from the heat of the standpipes.

Figure 19:
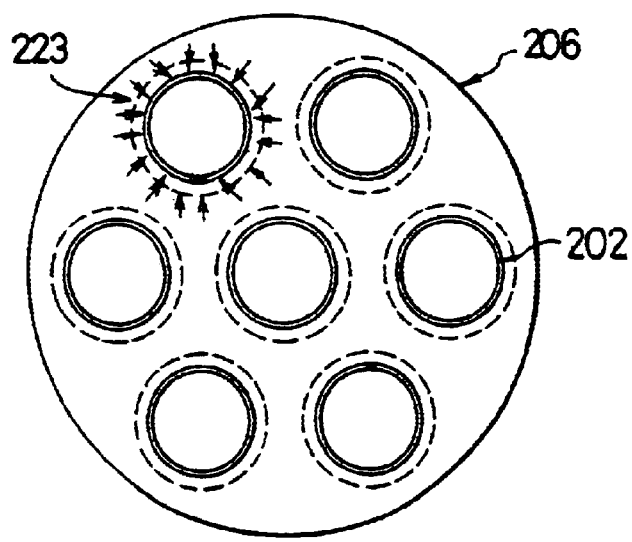
FIG. 19 is a cross-sectional view taken along the line XIX—XIX of FIG. 18.

A cylindrical spraying chamber 222 is provided around the space 219, the upper portion of which chamber communicates with the spraying steam chamber 216, so that the steam of a spraying medium therefrom can flow downwardly through the chamber 222 at high velocity. A multiplicity of spraying nozzles 223 is provided on the side wall of the feed stock tray 217 so that the feed stock therefrom is sprayed into the spraying chamber 222 to be mixed with steam. The resulting mixture collides with the thermal insulating partitions 221 and then flows horizontally over the entire outer periphery of the particles fed from the standpipes. The mixture is sprayed at an angle ranging from 0° (horizontally) to 90° (vertically), preferably from 0° to 45°. This angle can be varied by altering the angle of the partition 220. In the embodiment shown in FIG. 18, the mixture is sprayed at an angle of 0°, i.e. horizontally. As shown in FIG. 19, a plurality of spraying nozzles 223 is disposed at certain intervals in the circumferential direction to spray a feed stock entirely to the spraying chamber. The number of tiers on which each plurality of spraying nozzles 223 is disposed, spaced equally apart vertically, is selectable within the range between 1 and 6, preferably 1 and 3.

Figure 15:
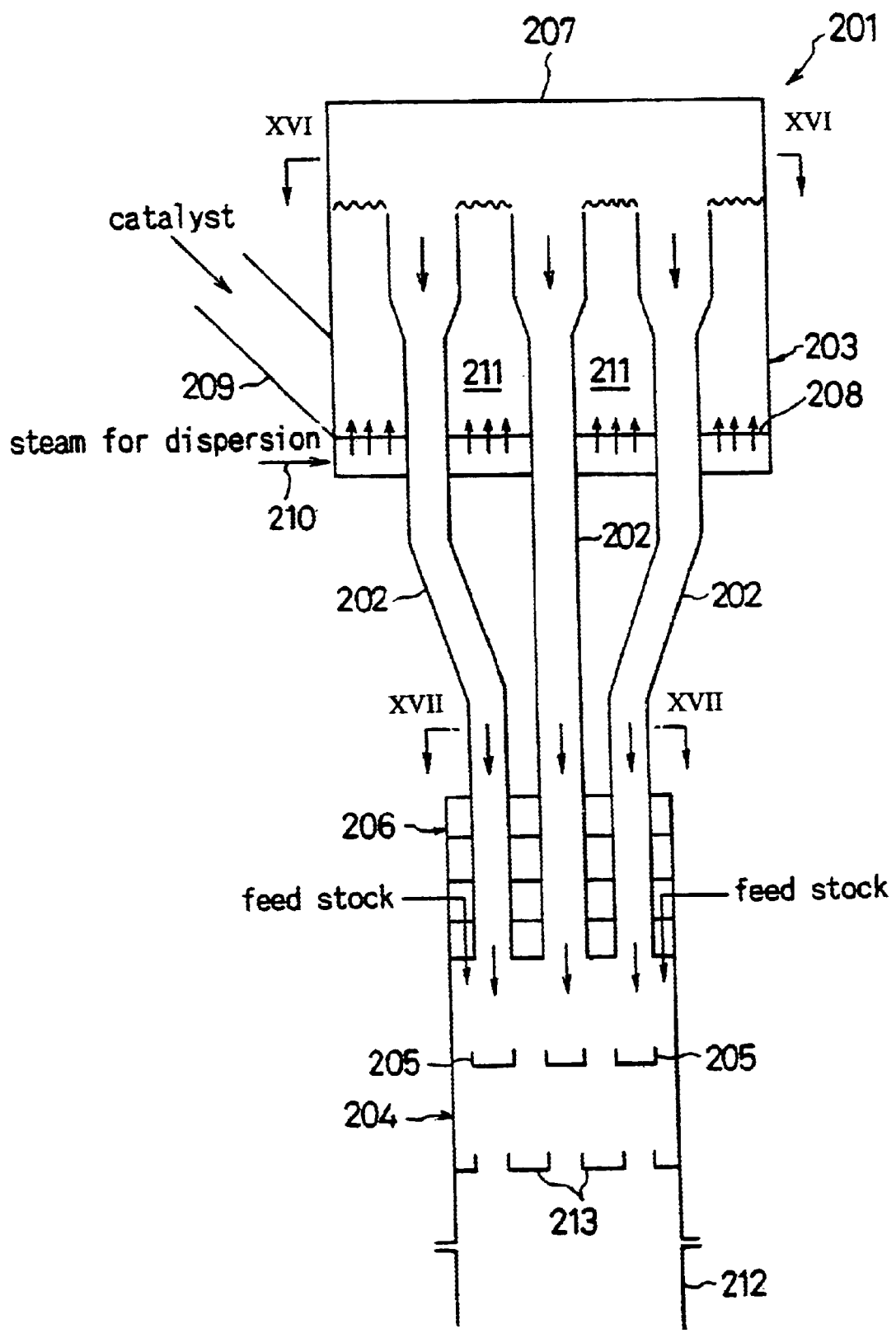
FIG. 15 is a cross-sectional view of an apparatus embodying another aspect of the invention.

The operation conducted by using the apparatus in FIG. 15 is now described hereinbelow.

Catalyst particles are fed continuously onto the porous plate 208 through the feed pipes 209 and are then fluidized by fluid gas to be formed into the fluidized bed 211. By forming the fluidized bed 211 in this way, particles fed excessively to a particular spot can be dispersed toward a part which has fewer particles, while being fluidized so that the particles can be dispersed at uniform density in a horizontal direction.

As the fluidized particle bed increases in height, a portion of the particles flows into the standpipes 202 beyond the upper edges thereof from all circumferential directions. Since the particles have been made uniform in density in a horizontal direction, as their height increases and then flows into the plurality of standpipes, the particles can be distributed into each of the standpipes in equal amounts.

The particles in each of the standpipes flow downwardly through the lower opening to the mixing chamber 204.

The particles further flow consecutively downwardly in the mixing chamber 204. The particles thus flow in the form of a cylinder, depending on the amount of the particles. Therefore, almost all the particles collide with the dispersing plates 205 and are then dispersed outwardly in the radial direction. For example, in the case of using a plate 205 in the form of a disk or a dish, the particles are piled up thereon in the form of a cone widening downwardly and having an angle of repose of around 20° as indicated by dotted lines in FIG. 18, so that the particles falling onto the piles fall along the slopes thereof outwardly in the radial direction. In the case of using disk- or dish-like plates 205 having a depressed center, the particles collecting in the middle of the plates 205 function as a cushion to absorb the impact exerted by the particles falling from the standpipes, leading to an advantage with respect to erosion.

Therefore, the dispersion of the particles is conducted in an effective manner by dispersing the particles falling from the plurality of the standpipes outwardly in the radial direction with the corresponding plates.

In the embodiment shown in FIG. 15, a feed stock is sprayed vertically from the fluid-feed chamber 206 in close proximity to and in surrounding relation to the outer periphery of the particles fed cylindrically from each of the standpipes. Whereupon, the feed stock can be sprayed without coking due to the insulating means 214 provided in the spraying chamber 222 (FIG. 18), which can thermally insulate the feed stock from the catalyst particles heated at a temperature of 450–700°.

The feed stock sprayed in this manner then collides with the particles dispersed outwardly in the radial direction and is further finely scattered by impact upon the collision, so that the feed stock can be mixed uniformly and rapidly with the particles. The resulting mixture is improved in contact efficiencies and the vaporization of the feed stock can,be effected sufficiently. Furthermore, due to the plurality of dispersion plates 205 and 213 provided in a multi-tier, the particles are further dispersed and come into contact (collide) with the feed stock, resulting in further enhancement of contact efficiency leading to the mixture being effected in a satisfactory manner. The resulting mixture flows downwardly into the reactor 212.

In the fluid-feed chamber 206 constructed as shown in FIG. 18, steam fed from the spraying steam tray 216 flows into the upper portion of the spraying chamber 222 and then flows downwardly thereinside at high velocity, and at the same time the feed stock in the feed stock tray 217 is sprayed into the spraying chamber 222 to be mixed with the steam therein. The mixture is brought into collision with the partition 221 and sprayed together with the steam fed from the thermal insulating and spraying steam tray 218 over the entire outer periphery of the particles fed in the form of a cylinder from each of the standpipes 203 in a horizontal direction. Namely, the feed stock is sprayed at right angles with respect to the flow direction of the particles fed cylindrically from each of the standpipes 203.

The feed stock sprayed in this manner is further made finer by the collision with the particles fed cylindrically, and then flows downwardly after being scattered to the vicinity of the outer periphery of the particles. The particles are dispersed in an outer radial direction by the dispersing plates 205 and collide again with the refined feed stock, so that the feed stock is further finely scattered, leading to an efficient dispersion of the feed stock.

Therefore, the catalyst particles and the feed stock can be mixed uniformly and rapidly and can contact each other efficiently, because the catalyst particles are distributed evenly to the plurality of standpipes 203 and dispersed by the dispersing plates after passing through the standpipes 203, and the feed stock comes into contact with the dispersed particles and is then finely scattered. The inventive apparatus is applicable to the case where the catalyst particles are used in a larger proportion to the feed stock, maximally 50 in the ratio therebetween.

Furthermore, the contact reaction can be conducted uniformly in an extremely short period of time due to the capability of reduction in time (approximately 0.1 to 1.5 seconds) for contacting a feed stock with catalyst particles, such that unfavorable excess cracking reaction can be avoided, leading to the capability of production of a gasoline enhanced inequality.

The invention will be further described by way of the following examples, which are provided only for illustrative purposes.

EXPERIMENT 1

Five types of mixing apparatus were used in the forms shown FIGS. 1, 2, 7, 8 and 3, which were designated as Apparatus A, B, C, D and E, respectively. The principal dimensions of each apparatus are shown in Table 1.

Catalyst particles were used which are generally used in a flowing catalytic cracking apparatus producing gasoline from a heavy oil. The catalyst was characterized by 63 microns in average particle size and 0.85 g/cm$^3$ in bulk density. Air at normal temperature was used as the fluid to be sprayed instead of a feed stock.

The experimental conditions were established on the assumption that mixing and gasification had just been completed by spraying a feed stock onto catalyst particles heated at a temperature of 600° C., but the reaction had not occurred yet. The experimental conditions based on this assumption were varied in feed rate of catalyst from 10 kg/min to 100 kg/min and in feed rate of air from 5 m$^3$/h to 50 m$^3$/h. The feed rate of air was adjusted by varying the spraying ratio of an internal spraying nozzle to an external spraying nozzle. These apparatus were made of vinyl chloride. The state of mixture was observed by using a video camera and by viewing.

EXAMPLE 1

Experiments were conducted using Apparatus A under the various conditions mentioned above. A fluidized bed of the catalyst fed at a feet rate of 30 kg/min flowed beyond the upper edge of the forming section and fell freely therethrough. A feed rate exceeding 30 kg/min led to a fluidized bed increased in height, and as a result thereof the particles which flowed beyond the edge of the forming section were forced to flow into the forming section by the air supplied to disperse the fluidized bed. This is presumably caused by pressure loss in the forming section. However, particles fed at both the increased feed rate and the reduced feed rate, after passing through the forming chamber, were formed into a satisfactory annular shape. It is observed that the particles flowed locally toward the center of the reactor when the mixture was conducted by using only the external nozzles. On the contrary, when only the internal nozzles were used, it was observed that the particles collided with the inner wall of the reactor. Mixing was most excellent when the spray ratio of the external nozzles to the internal nozzles was 2 to 1. Mixing was improved with an increase of the feed rate of air.

EXAMPLE 2

The same experiments as those of Example 1 were conducted using Apparatus B. As was the case with Apparatus A, Apparatus B was excellent in forming the particles into an annular shape and in mixing the particles and the air. The annulus of particles formed by Apparatus A had a diameter of 60 mm, while that formed by Apparatus B had a diameter of 70 mm. However, no difference was observed in the mixture thus obtained resulting from the difference in diameter.

EXAMPLE 3

The same experiments as those of Example 1 were conducted using Apparatus C. Apparatus C was provided in the controlling section with baffles for adjusting the density of the particles so that the particles were distributed uniformly in density, and the baffles were constructed so that the particles fell freely through the forming section. In this connection, the catalyst particles started accumulating in the controlling section when fed at a rate exceeding 20 kg/min. Whereas when fed at a rate increased up to 30 kg/min, the catalyst particles filled the control section and passed through the moving bed-forming section with their own weight increased with the accumulated particles increased in height. However, this was able to be avoided by introducing air from somewhere in the middle portion of the feed pipe. In both cases, the particles were formed into a satisfactory annular shape and mixed excellently with the air.

EXAMPLE 4

The experiments were conducted using Apparatus D. In the experiment conducted to observe the mixing of the particles and the air, only the external spraying nozzles were used. The external spraying nozzles were set to spray air in a horizontal direction, differently from those of the other apparatus. The particles were not mixed well with the air, because they flowed locally along the center portion of the reactor.

EXAMPLE 5

The same experiments as those of Example 1 were conducted using Apparatus E, which had an increased diameter annular moving bed-forming section, so as to deal with the situation that the catalyst particles had an increased feed rate. In this apparatus, the particles did not increase in level in the chamber, even though the feed rate thereof was increased up to 100 kg/min, and thus were able to pass smoothly through the forming section beyond the edge of the outer tube constituting the forming section. As was the case with Example 1, the particles were formed into a satisfactory annular shape and mixed excellently with the air.

EXPERIMENT 2

The apparatus used for this experiment were two-dimensional models. Two-dimensional models B, C and E correspond to the apparatus shown in FIGS. 2, 7 and 3. The dimensions of each of the two-dimensional models were one and a half times larger than those of the respective corresponding apparatus and 10 mm in thickness. A total of four spraying nozzles were disposed in pairs, with two external spraying nozzles being arranged oppositely oriented to two internal spraying nozzles. All of these spraying nozzles were disposed to spray downwardly at an angle of 45° with respect to the flow direction of the particles. The principal dimensions of each of the two-dimensional models are shown in Table 2.

EXAMPLE 6

The shape of the annularly flowing particles and the mixing of the particles and the air in the reactor were observed using Model B with varied feed rates of the catalyst and the air. Actually, the annularly flowing particles formed in this model were in the form of a quadratic prism, but are referred to as "annular" for the sake of convenience. It was observed that the annularly flowing particles tended to be increased in density in the outer periphery when fed at a low rate. The mixing in the reactor was extremely improved when the air feed ratio of the external spraying nozzles to the internal spraying nozzles was 1:1.

EXAMPLE 7

The same experiments as those of Example 6 were conducted using Model C, which was provided with baffles to make the density of the particles uniform. Due to the provision of the baffles, the particles were dispersed uniformly in density, and thus formed into a satisfactory annular shape, as was the case with Example 6. The mixing in the reactor was also excellent, as in Example 6.

EXAMPLE 8

The same experiments were conducted as those of Example 6 using Model E. This model corresponds to Apparatus E having a forming zone whose diameter was larger than that of the reactor, to deal with the situation that the particles were fed at an extremely high rate. The particles thus formed an annulus having a larger diameter than that of the reactor, whereby the annulus of particles was increased in density at the outer periphery when the spraying ratio of the external spraying nozzles to the internal spraying nozzles was 1:1. The mixing was improved with the spraying rate of the external spraying nozzles increased gradually. With further increase of the spraying rate, the mixing deteriorated. Therefore, it was observed that there existed an optimum in the spraying ratio of the external spraying nozzles to the internal spraying nozzles. The optimum ratio was substantially 1.5:1. The mixing was excellent at this ratio.

EXPERIMENT 3

An apparatus (Apparatus F) was used in the form shown in FIG. 18, which was made from transparent vinyl chloride. The principal dimensions of this apparatus are shown in Table 3.

Particles of a catalyst were used which are generally used in a flowing catalytic cracking apparatus producing gasoline from a heavy oil. The catalyst was characterized by 63 microns average particle size and 0.85 g/cm$^3$ in bulk density. Air at normal temperature was used as the fluid to be sprayed instead of a feed stock.

The experimental conditions were established on the assumption that mixing and gasification had just been completed by spraying a feed stock onto catalyst particles heated at a temperature of 600° C., but the reaction had not occurred yet. The experimental conditions based on this assumption were varied in feed rate of catalyst from 50 kg/min to 350 kg/min and in feed rate of air from 20 m$^3$/h to 120 m$^3$/h. The air was fed from the second, third and forth spraying nozzles arranged vertically in tiers with the feed rate of each of the nozzles varied. Mixing was observed by using a video camera and viewing.

EXAMPLE 9

The above-described experiments were conducted using Apparatus F, and the results thereof were as follows:

(1) It was observed that the catalyst particles from the dispersing device flowed uniformly into the seven standpipes disposed therein.

(2) The mixing was fairly excellent due to the provision of the dispersing plates, although the air was only fed from the feed chamber and not fed from the tray.

(3) The dispersion of the particles improved as the feed rate of air from the tray increased.

(4) Under conditions where the feed rate of air from each of the nozzles was constant, the mixing improved as the feed rate of air from the four nozzles increased.

EXAMPLE 10

The experiments were conducted using the two-dimensional model of Apparatus F whose primary dimensions were the same as those of Apparatus F and were 1 cm thick.

The feed rates of particles and air were one fifteenth of those in Example 9 to be in conformity with the ratio of the sectional area of the Apparatus F to that of the model. Mixing was observed by using a video camera and by viewing, as in Example 9. The results were as follows:

(1) The particles from the feed chamber flowed uniformly into the seven standpipes disposed therein. However, the particles mostly tended to flow toward the outside but not toward the center of the standpipes, when fed at a low rate.

(2) Although the effect of the dispersing plates arranged in two tiers was recognized, the mixing was not satisfactory when the air was fed only from the feed chamber but not from the tray. The mixing was extremely improved as the feed rate of air from the tray increased.

(3) The mixing was improved as the feed rate of air from the fourth tray increased, as in Example 9.

(4) The particles which passed through the standpipes fell onto the dispersing plates and were formed into a mound having a repose angle of around 20°. The dispersing plates used in this example were in the form of a shallow tray. The particles accumulating on the plates played a role as a cushion in absorbing the impact caused by the particles falling from the standpipes. This is advantageous to avoid erosion.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 1

| | Dimensions of Apparatus | | | | |
|---|---|---|---|---|---|
| | Apparatus A | Apparatus B | Apparatus C | Apparatus D | Apparatus E |
| Diameter of Controlling Section mm | 200 | 200 | 100 | 100 | 320 |
| Length of Controlling Section mm | 300 | 300 | 250 | 250 | 300 |
| Diameter of Outer Tube | 60 | 70 | 70 | 70 | 100 |

TABLE 1-continued

Dimensions of Apparatus

|  | Apparatus A | Apparatus B | Apparatus C | Apparatus D | Apparatus E |
|---|---|---|---|---|---|
| Length of Outer Tube mm | 100 | 100 | 50 | 50 | 100 |
| Diameter of Inner Tube mm | 30 | 40 | 40 | 40 | 60 |
| Diameter of Spray Nozzle for Feed Stock mm |  |  |  |  | 100 |
| Diameter of Reactor mm | 80 | 80 | 80 | 80 | 80 |
| Diameter of External Nozzle mm | 2 | 2 | 2 | 2 | 2 |
| Number of External Nozzles | 32 | 32 | 32 | 32 | 32 |
| Diameter of Internal Nozzle mm | 2 | 2 | 2 | 2 | 2 |
| Number of Internal Nozzles | 16 | 16 | 16 | 16 | 16 |
| Downward Angle of Spraying Feed Stock degrees | 45 | 45 | 45 | Horizontal 0 | 45 |

TABLE 2

Dimensions of Two-Dimensional Model Mixing Apparatus

|  | Two-Dimensional Model B | Two-Dimensional Model C | Two-Dimensional Model E |
|---|---|---|---|
| Diameter of Controlling Section mm | 300 | 150 | 320 |
| Length of Controlling Section mm | 300 | 250 | 300 |
| Diameter of Outer Tube mm | 100 | 100 | 150 |
| Length of Outer Tube mm | 150 | 70 | 150 |
| Diameter of Inner Tube mm | 60 | 60 | 90 |
| Diameter of Spray Nozzle for Feed Stock mm |  |  | 150 |
| Diameter of Reactor mm | 120 | 120 | 120 |
| Thickness of Mixing Section and Reactor mm | 10 | 10 | 10 |
| Diameter of External Nozzle mm | 3.5 | 3.5 | 3.5 |
| Number of External Nozzle | 2 | 2 | 2 |
| Diameter of Internal Nozzle mm | 3.5 | 3.5 | 3.5 |
| Number of Internal Nozzle | 2 | 2 | 2 |
| Downward Angle of Spraying Feed Feed Stock degrees | 45 | 45 | 45 |

TABLE 3

Dimensions of Apparatus

|  | Apparatus |
|---|---|
| Diameter of Dispersing Device mm | 320 |
| Diameter of Standpipe mm | 30 |
| Diameter of Mixing Section mm | 160 |
| Diameter of Dispersing Plate mm | 30 |
| Diameter of Reactor mm | 160 |
| Diameter of Nozzle mm | 2 |
| Number of Nozzles | 224 |
| (16 × 2 × 7) |  |

We claim:

1. An apparatus for mixing a fluid feedstock and particles of a catalyst for gasifying the fluid, which comprises a plurality of stand pipes extending vertically; a distributing device for distributing the particles uniformly into said stand pipes; a mixing section positioned below said distributing device from an interior of which said stand pipes extend to an upper interior of said mixing section to feed the particles thereto; a plurality of upper disk-, dish- or cone-shaped plates having diameters no less than those of lower ends of said stand pipes, said plates being arranged in a horizontal array in said mixing section and below said stand pipes for dispersing of the particles falling therefrom outwardly in a radial direction; and a fluid feed section arranged in said mixing section in surrounding relation to an outer periphery of each of the stand pipes to spray the fluid downwardly in a vertical direction in close proximity and in surrounding relation to an entire outer periphery of a column of particles falling from each of the stand pipes so as to collide with the particles after being dispersed by the plates.

2. The apparatus according to claim 1, wherein said fluid feed section has a spraying device for spraying the fluid using a spray medium.

3. The apparatus according to claim 2, wherein said spray medium is steam or air.

4. The apparatus according to claim 1, wherein a thermal insulating device is provided in surrounding relation to said fluid feed section and comprises trays containing steam for thermal insulation to prevent the fluid sprayed into said fluid section from being affected by heat of the particles heated at a temperature of over 300° C.

5. The apparatus according to claim 1, wherein said mixing section is provided below said upper plates with a further plurality of plates for further dispersing the particles dispersed by said upper plates, the further plurality of plates being disposed at least where the particles fall in an increased density.

6. The apparatus according to claim 1, wherein said fluid feedstock is a heavy oil.

7. An apparatus for mixing a fluid feedstock and particles of a catalyst for gasifying the fluid, which comprises a plurality of stand pipes extending vertically; a distributing device for distributing the particles uniformly into said stand pipes; a mixing section positioned below said distributing device from an interior of which said stand pipes extend to an upper interior of said mixing section to feed the particles thereto; a plurality of upper disk-, dish- or cone-shaped plates having diameters no less than those of lower ends of said stand pipes, said plates being arranged in a horizontal array in said mixing section and below said stand pipes for dispersing of the particles falling therefrom outwardly in a radial direction; and a fluid feed section arranged in said mixing section in surrounding relation to an outer periphery of each of the stand pipes to spray the fluid over an entire periphery of a column of particles falling from each of the stand pipes.

8. The apparatus according to claim 7, wherein a disk-shaped partition is disposed below said stand pipes and has openings just under the lower ends of the stand pipes.

9. The apparatus according to claim 7, wherein said fluid feed section is a spraying device for spraying the fluid using a spray medium.

10. The apparatus according to claim 9, wherein said spray medium is steam or air.

11. The apparatus-according to claim 5, wherein a thermal insulating device is provided in surrounding relation to said fluid feed section and comprises trays containing steam for thermal insulation to prevent the fluid sprayed into said fluid section from being affected by heat of the particles heated at a temperature of over 300° C.

12. The apparatus according to claim 7, wherein said mixing section is provided below said upper plates with a further plurality of plates for further dispensing the particles dispersed by said upper plates, the further plurality of plates being disposed at least where the particles fall in an increased density.

13. The apparatus according to claim 7, wherein said fluid feedstock is a heavy oil.

* * * * *